United States Patent [19]

Boessler et al.

[11] 4,199,486

[45] Apr. 22, 1980

[54] PLASTISOLS COMPRISING COPOLYMERS OF METHYL METHACRYLATE

[75] Inventors: Hans Boessler, Darmstadt; Peter Quis, Darmstadt-Neu-Kranichstein; Joachim Buechse, Astheim; Hubert Rauch, Weiterstadt, all of Fed. Rep. of Germany

[73] Assignee: Rohm GmbH, Darmstadt, Fed. Rep. of Germany

[21] Appl. No.: 905,092

[22] Filed: May 11, 1978

[30] Foreign Application Priority Data

May 20, 1977 [DE] Fed. Rep. of Germany ....... 2722752

[51] Int. Cl.$^2$ .............................................. C08K 5/12
[52] U.S. Cl. .............................. 260/31.8 M; 525/309; 525/902
[58] Field of Search ................... 260/31.8 R, 31.8 M, 260/885; 525/309, 902

[56] References Cited

U.S. PATENT DOCUMENTS

| | | | |
|---|---|---|---|
| 2,600,122 | 6/1952 | Meyer | 260/31.8 R |
| 3,787,522 | 1/1974 | Dickie | 260/885 |
| 3,914,338 | 10/1975 | Krieg | 260/885 |
| 3,943,190 | 3/1976 | Abe | 260/885 |
| 3,985,703 | 10/1976 | Ferry | 260/885 |
| 4,052,525 | 10/1977 | Ide | 260/885 |
| 4,125,700 | 11/1978 | Graham | 260/31.8 R |

FOREIGN PATENT DOCUMENTS 2454235 12/1976 Fed. Rep. of Germany .

*Primary Examiner*—Paul R. Michl
*Attorney, Agent, or Firm*—Curtis, Morris & Safford

[57] ABSTRACT

A storage-stable plastisol is disclosed comprising an organic plasticizer and particles of a methyl methacrylate copolymer, said particles comprising a core portion of a polymer compatible with said plasticizer and a surrounding shell portion of a polymer incompatible with the plasticizer.

3 Claims, No Drawings

PLASTISOLS COMPRISING COPOLYMERS OF METHYL METHACRYLATE

The present invention relates to plastisols comprising copolymers of methyl methacrylate and organic plasticizers.

Plastisols are liquid to paste-like mixtures which contain a particulate polymer in a liquid organic plasticizer and, as a rule, also contain inorganic fillers and which gel on warming to form a solid body. Polyvinyl chloride is predominantly used as the particulate polymer because it has the property, necessary for the end to be accomplished, that it does not dissolve in the liquid plasticizer at room temperature even during long periods of storage. On heating to at least 80° C., a solution of the polyvinyl chloride in the plasticizer is created, which solution has the properties of a solid body because of the high concentration of polymer therein. On cooling to room temperature, the gel solution permanently retains its homogeneous quality.

Polyvinyl chloride has various disadvantages as the polymer component of plastisols. Under the influence of light, coatings prepared therefrom become yellow. Under the influence of heat, polyvinyl chloride splits off hydrogen chloride which can lead to corrosion in finishing processes in which heat is employed or, in case of fire or if the waste material is disposed of by burning, hydrogen chloride can be created in dangerously high concentrations. It has thus been proposed in German Auslegeschrift No. 2,454,235 to prepare plastisols comprising methyl methacrylate polymers and organic plasticizers.

To be sure, homopolymers and copolymers of methacrylate do not have the aforementioned disadvantages of polyvinyl chloride, but they also do not have the particular advantages of the latter material in the gelling process. Polymethyl methacrylate and many copolymers of methyl methacrylate form stable plastisols with organic plasticizers, which plastisols gel on heating to 150° C., for example. However, in many cases when the gel material is cooled to room temperature, the mixture proves to be unstable and exudes the plasticizer in liquid form. This is particularly true of the plasticizers which are especially commonly used technically because of their low price, for example phthalic acid exters. To be sure, the compatibility of methyl methacrylate copolymers with phthalate plasticizers can be increased by using acrylic acid esters of methacrylic acid esters of higher alcohols as comonomers. The plasticized gel masses prepared with these copolymers do remain homogeneous at room temperature and below for indefinite periods of time, but plastisols prepared in this manner gel at room temperature within a few days. Storage-stable plastisols are obtained with these copolymers only by using special plasticizers, such as dipropyleneglycol dibenzoate or tri-ethylhexyl-mellithate, which are relatively expensive. To a small degree, storability can also be improved by the use of relatively coarse polymer particles. However, this improvement in storability is accompanied by the disadvantage that a longer time is required for the gelation process and by impaired film properties.

The object of the invention was to find methyl methacrylate polymers for the preparation of plastisols which are storage-stable for a long period of time even when common cheap plasticizers are used and which, after gelation, would not again exude these plasticizers at room temperature.

The plastisols according to the invention contain a methyl methacrylate copolymer and an organic plasticizer in a ratio by weight of 10:3 to 1:10, together with conventional fillers.

The copolymer according to the present invention is composed of a core material and a shell material in a ratio by weight of 3:1 to 1:3. The core material is a homopolymer or copolymer comprising:

(A) 15 to 100 percent by weight of an alkyl acrylate having at least three carbon atoms, preferably three to 20 carbon atoms, in the alkyl portion and/or an alkyl methacrylate having at least two carbon atoms, preferably two to 20 carbon atoms, in the alkyl portion, and/or styrene;

(B) 0 to 85 percent by weight of methyl acrylate, methyl methacrylate, or ethyl acrylate; and (C) 0–20 percent by weight of other free radically-polymerizable comonomers copolymerizable therewith.

The shell material is a homopolymer of methyl methacrylate or a copolymer thereof comprising at least 80 percent by weight of methyl methacrylate and having a glass temperature ($T_g$) above 50° C.

The core material is a polymer that is characterized by good compatibility with plasticizers, particularly also with phthalate plasticizers such as dioctyl phthalate. The core material alone would gel together with the plasticizer even at room temperature within a short period of time. The shell material is a homopolymer or a copolymer of methyl methacrylate, which is resistant without limit to plasticizers at room temperature but which—after gelling and cooling—does not tightly retain the plasticizer without limit in a homogeneous phase. During storage, the shell material affords sufficient protection against the premature gelation of the core material. If gelation has taken place at an elevated temperature, the plasticizer is so tightly bound by the core material that its incompatibility with the shell material no longer leads to demixing or separation.

The compatibility of the core material with plasticizers is attributable to its content of acrylic acid alkyl esters having at least three carbon atoms in the alkyl portion, or of methacrylic acid alkyl esters having at least two carbon atoms in the alkyl portion, or on its contents of styrene. With few exceptions, such as that of polyethyl methacrylate, the affinity of homopolymers comprising these monomers toward plasticizers, particularly toward phthalic acid esters, is so great that the surrounding skin of shell material would not afford any lasting protection against gelation at room temperature if this affinity were not reduced by the presence of the strongly polar monomers (B).

For industrial purposes, storage-stability can be considered to be sufficient if a plastisol does not gel within 21 days at 30° C. A shorter storability, for example of three to five days, is sufficient in many cases, for example if the plastisol is both prepared from its components and further worked-up in the same plant. In comparison with plastisols which do not contain layered polymers, which gel at room temperature even within a few hours and for this reason are entirely useless industrially, plastisols according to the present invention having a storability of only a few days represent an important technical advance, since such materials cross the threshold of industrial utilizability.

Since the affinity between the core material and the plasticizer depends to a large degree on their chemical composition, the amount of polar monomers (B) required in the core polymer is dependent on the nature of the plasticizer, on the nature of the monomers or monomer mixtures chosen from groups (A) and (B), and to a lesser degree on the ratio of the amounts of core material to shell material. Thus the polymer composition is always coordinated with the plasticizers to be employed and permits only small deviations, within the limits given for components (A) and (B), from an ascertained optimum. In the preferred case, the core material contains a methacrylic acid alkyl ester having 4 to 18 carbon atoms as component (A) and contains methyl acrylate, ethyl acrylate, methyl methacrylate, or mixtures thereof as component (B). In addition to the monomers of groups (A) and (B), further free radically polymerizable monomers can be present in the composition of the core material in an amount up to 20 percent by weight if their presence is desired for particular reason. Such materials include acrylic acid and methacrylic acid, their amides, their nitriles, their hydroxyalkyl esters and aminoalkyl esters, vinyl esters of aliphatic carboxylic acids, vinyl pyrrolidone, vinyl imidazole, and the like.

Polymethyl methacrylate is well suited as a shell material. If a copolymer of methyl methacrylate is employed instead of this, then the amount of the comonomer or comonomers must be smaller the less polar they are. The monomers of group (A) are examples of nonpolar monomers; their amount in the shell material is preferably not more than ten percent. More strongly polar comonomers, such as those of group (B), can comprise up to 20 percent by weight of the shell material. The choice of the kind and amounts of the comonomers optionally employed in addition to methyl methacrylate is such that the shell material, if it were polymerized by itself, would have a glass temperature above 50° C. Small amounts of strongly polar copolymers in the shell material, for example 0.5 to 8 percent of acrylic acid or methacrylic acid, or of acrylamide or methacrylamide, have an advantageous effect on the storage-stability of the plastisols.

Since the plastisols are often employed as coating agents, particularly for metal, adhesion-improving monomers are preferably employed in preparing the polymers. As such, unsaturated carboxylic acids such as acrylic acid or methacrylic acid and hydroxyalkyl esters or aminoalkyl esters of these acids, can be mentioned. N-vinylimidazole is particularly effective. The adhesion-improving effect of these comonomers is apparent even when they are present in amounts from 0.1 to 5 percent, preferably from 1 to 2 percent, by weight. The adhesion-improving comonomers can be copolymerized into the core material, into the shell material, or into both materials.

The significance of the layered structure of the emulsion polymer is evident from a comparison in the following Table I of a plastisol prepared according to the invention with mixtures in which the same plasticizers are employed with the same amounts of core polymer alone, or in the shell polymer alone, or with a mixture of these two polymers. For a further comparison, a copolymer is also employed the overall composition of which corresponds with the polymer composition of the plastisol according to the invention, but which is not formed in a layered structure.

Table I

Plastisol comprising two parts of polymer and three parts of dioctyl phthalate: storage at 30° C.; gelation 30 minutes at 150° C.

| Polymer | | Storage stability (in days at 30°) | Gelled Product |
|---|---|---|---|
| Core material 30% BA, 70% MMA | 1:1 | >21 | Compatible |
| Shell material PMMA | | | |
| Copolymer 30% BA, 70% MMA | | 0 | Compatible |
| PMMA | | >21 | Incompatible |
| Mixture of PMAA + copolymer of 30% BA, 70% MMA (1:1) | | 0 | Compatible |
| Copolymer of 15% BA, 85% MMA | | 5 | Incompatible |

Key:
BA = n-butylacrylate, MMA = methyl methacrylate, PMMA = polymethyl methacrylate The determination of the optimum polymer composition for the dioctyl phthalate employed as a plasticizer is illustrated in the following Table II.

Table II

| Polymer | | Storage Stability | Gel |
|---|---|---|---|
| Core | Shell | (in days at 30° C.) | Product |
| 20% BA, 80% MMA | PMMA | >21 | Incompatible |
| 30% BA, 70% MMA | PMMA | >21 | Compatible |
| 35% BA, 65% MMA | PMMA | 12 | Compatible |
| 40% BA, 60% MMA | PMMA | 3 | Compatible |
| 45% BA, 55% MMA | PMMA | 1 | Compatible |
| 50% BA, 50% MMA | PMMA | ½ | Compatible |

The construction of the copolymer from a core material and a shell material is accomplished in known fashion using a particular process during emulsion polymerization. Namely, the monomers forming the core material are polymerized in an aqueous emulsion in a first process step. When the monomers of the first step are essentially totally polymerized, the monomer components of the shell material are added to the emulsion polymer under such conditions that the formation of new particles is avoided. In this way, the polymer formed in the second stage is formed as a layer around the core material. An advantageous ratio of the shell thickness to the size of the core is obtained if the ratio by weight of the core material to the shell material is maintained between 1:3 to 3:1. By a suitable choice of the amount of emulsifier, the particle size can be influenced—that is the particles are larger the smaller the amount of emulsifier employed. The average particle size can be in the region from 0.05 to 5 microns, for example.

In the first polymerization step, in which core material forms, 0.01 to 1 percent by weight, calculated on the water phase, of anionic, cationic, or non-ionic emulsifiers are employed, such as sodium lauryl sulfate, alkylbenzene sulfonates, and oxethylation products of alkylated phenols or of their neutralized sulfation products. The polymerization is preferably initiated at temperatures between 60° C. and 100° C. with the aid of water-soluble free radical-formers, such as potassium or ammonium persulfate or hydrogen peroxide. Before the beginning of the second polymerization step, initiator can again be added. However little or no additional emulsifier is used in the second stage.

For conversion of the 30 to 60 percent dispersions which are usually obtained into a dry powder, the dispersions are dried in a known fashion in the form of thin layers in flat containers or on rolls, or preferably by spray drying at temperatures between 50° C. and 100° C.

For preparation of the plastisol, the powdered material, optionally together with a filler such as chalk, kaolin, mica flour, or the like, the amount of which can be several-fold the amount of polymers, is mixed with a liquid plasticizer. The ratio by weight of polymer to plasticizer can be chosen between 10:3 and 1:10 and is preferably chosen from 2:3 to 1:2. The flow properties of the plastisols can be adapted to any manufacturing process by varying the ratio of liquid and solid components. Plastisols suitable for spraying or dipping are made to be liquid or cream-like and are optionally combined with thixotroping additives to suppress dripping of the coating from dipped or spray-coated objects. For use as caulking and patching compositions, the plastisol is adjusted to a paste-like condition.

As plasticizers, practically all those materials can be considered which are also used for the preparation of polyvinyl chloride plastisols. Particularly preferred are phthalate plasticizers such as dioctyl phthalate or dibutyl phthalate. Additional well-suited plasticizers are, for example, sebacic acid esters and azelaic acid esters, as well as polymeric plasticizers comprising polyadipic acid esters, carbamid acid resins or urea formaldehyde resins.

The plastisols can be applied to metallic or nonmetallic substrates in layer thicknesses from 5 microns to 5 mm by dipping, spraying, painting, or with a doctor blade and are gelled at temperatures from 90° C. to 200° C. By gelation in suitable molds, shaped bodies can also be prepared. The preparation of the copolymers and their conversion to plastisols is evident from the following Examples, given by way of illustration.

EXAMPLES 1–27

(A) Preparation of polymer powders 0.1 g of ammonium peroxydisulfate and 0.3 g of $C_{15}$paraffin sulfonate (commercially available as "Emulsifier K30", Bayer AG) are dissolved at 80° C. in 400 g of distilled water in a 2-liter Wittig flask equipped with reflux condenser, stirrer, and dropping funnel. Emulsion 1 is added dropwise to this solution with stirring over 1½ hours.

| Emulsion 1 (core material): | 500 g | of monomer (see Table) |
|---|---|---|
| | 2.35 g | of emulsifier |
| | 0.15 g | of initiator |
| | 300 g | of distilled water. |

Subsequently, emulsion 2 is added over a period of 1½ hours.

| Emulsion 2 (shell material): | 500 g | of monomer (see Table) |
|---|---|---|
| | 2.35 g | of emulsifier |
| | 0.15 g | of initiator |
| | 300 g | of distilled water |

After everything has been added, the batch is maintained at 80° C. for two hours, and is then cooled to about 25° C. The dispersion is converted to a finely divided polymer powder by spray drying. Those powdered polymers in which a strong sintering of the latex particles is avoided by protective drying have the best properties from the point of view of use in plastisols.

(B) Preparation and Testing of Plastisols 40 parts by weight of polymer powder and 60 parts by weight of dioctyl phthalate are mixed and homogenized on a three roll mill. The mixture is stored at 30° C. and the increase in viscosity is followed for up to 21 days using a Brookfield rotation viscosimeter. The limit of storability can be viewed as reached when the viscosity reaches 1000 poises.

For testing plasticizer compatibility, sheet iron is coated with a 5 mm thick layer of the plastisol which is gelled for 30 minutes at 100° C. or for 10 minutes at 180° C. If there is no exudation of the plasticizer from the gelled coating determinable within seven days, the mixture is deemed compatible. The test results are recorded in the following Table III.

TABLE III

| | Polymer | | Storage stability | Gelled |
|---|---|---|---|---|
| Examples | Core | Shell | (in days at 30° C.) | Product |
| 1 | 20% BA, 80% MMA | MMA | >21 | Incompatible |
| 2 | 30% BA, 70% MMA | MMA | >21 | Compatible |
| 3 | 35% BA, 65% MMA | MMA | 12 | Compatible |
| 4 | 40% BA, 60% MMA | MMA | 3 | Compatible |
| Comparison Example | | | | |
| | Copolymer: | | | |
| 4a | 20% BA, 80% MMA | | 1 | Incompatible |
| Comparison Example | | | | |
| | Mixture: | | | |
| 4b | 40% BA, 60% MMA + PMMA = 1/1 | | Immediately thickened | Compatible |
| 5 | 45% BA, 55% MMA | MMA | 1 | Compatible |
| 6 | 50% BA, 50% MMA | MMA | 1/2 | Compatible |
| 7* | 35% BA, 65% MMA | 95% MMA, 5% MAA | >21 | Compatible |
| 8* | 35% BA, 65% MMA | 95% MMA, 5% MMAA | >21 | Compatible |
| 9* | 35% BA, 65% MMA | 95% MMA, 5% AS | >21 | Compatible |

TABLE III-continued

| Examples | Polymer Core | Shell | Storage stability (in days at 30° C.) | Gelled Product |
|---|---|---|---|---|
| 10* | 35% BA, 65% MMA | 95% MMA, 5% MAS | >21 | Compatible |
| 11* | 40% BA, 60% MMA | 80% MMA, 20% MA | 3 | Compatible |
| 12 | 15% nBMA, 85% MMA | MMA | >21 | Incompatible |
| 13 | 50% nBMA, 50% MMA | MMA | >21 | Compatible |
| 13 Comparison Example | Copolymer: | | | |
| 13a Comparison Example | 25% nBMA, 75% MMA | | >21 | Incompatible |
| | Mixture: | | | |
| 13b | 50% nBMA, 50% MMA + MMA = 1/1 | | Immediately thickened | Compatible |
| 14 | 70% nBMA, 30% MMA | MMA | 6 | Compatible |
| 15 | 70% nBMA, 25% MMA 5% MAS | MMA | >21 | Compatible |
| 16 | 70% nBMA, 30% MA | MMA | 3 | Compatible |
| 17 | 20% nBMA, 50% MMA 30% St | MMA | >21 | Compatible |
| 18 | 10% EHA, 90% MMA | MMA | >21 | Incompatible |
| 19 | 20% EHA, 80% MMA | MMA | >21 | Compatible |
| 20 | 30% EHA, 70% MMA | MMA | 19 | Compatible |
| 21 | 100% EMA | MMA | >21 | Compatible |
| 22 | 70% EMA, 30% MMA | MMA | >21 | Compatible |
| 23 | 80% i.BMA, 20% MMA | MMA | >21 | Compatible |
| 24 | 20% EHMA, 80% MMA | MMA | >21 | Compatible |
| 25* | 30% BA, 69% MMA 1% VJ | 99% MMA, 1% VJ | >21 | Compatible |
| 26 | 80% MMA, 20% FMA | MMA | 10 | Compatible |
| 27 | 80% EMA, 20% EA | MMA | >21 | Compatible |

Key:
| | |
|---|---|
| MA | Methyl acrylate |
| MMA | Methyl methacrylate |
| EMA | Ethyl methacrylate |
| BA | n-Butyl acrylate |
| nBMA | n-Butyl methacrylate |
| MAA | Methacrylamide |
| MMAA | Methylol methacrylamide |
| EA | Ethyl acrylate |
| i.BMA | iso-Butyl methacrylate |
| EHMA | Ethylhexyl methacrylate |
| EHA | Ethylhexyl acrylate |
| AS | Acrylic acid |
| MAS | Methacrylic acid |
| St | Styrene |
| VJ | Vinyl imidazole |
| FMA | Methacrylic acid esters of mixed fatty $C_{12}$-$C_{18}$ alcohols |

*The glass temperatures (Tg) for the shell copolymers of these examples are as follows: 7, 110° C.; 8, 105° C.; 9, 110° C.; 10, 115° C.; 11, 80° C.; 25, 105° C.

Whereas as in Examples 1-27, the weight ratio of core material: shell material is 1:1, in Examples 28 and 29 this is adjusted to 2:1 and 1:2, respectively.

Example 28

0.1 g of ammonium peroxydisulfate and 3 g of a $C_{15}$paraffin sulfonate (tradename "Emulsifier K30", Bayer AG) are dissolved in 400 g of distilled water present in a 2-liter Wittig flask equipped with reflux condenser, stirrer, and dropping funnel. Emulsion 1 is added dropwise to the solution at 80° C. with stirring over two hours.

| Emulsion 1 (core material): | 417 g | of MMA |
|---|---|---|
| | 250 g | of BA |
| | 3.13 g | of emulsifier |
| | 0.20 g | of initiator |
| | 400 g | of distilled water |

Subsequently, the addition of emulsion 2 follows over a period of one hour:

| Emulsion 2 (shell material): | 333 g | of MMA |
|---|---|---|
| | 1.57 g | of emulsifier |
| | 0.10 g | of initiator |
| | 200 g | of distilled water |

After everything is added, the batch is kept for two hours at 80° C., then cooled to about 25° C. and spray dried. The testing of the plastisol properties follows as in Examples 1-27.

| Storage stability at 30° C.: | 21 days |
|---|---|
| Gelled product: | compatible. |

Example 29

Example 28 is followed with the difference that the following emulsion is added dropwise over one hour:

| Emulsion 1 (core material): | 250 g | of nBMA |
|---|---|---|
| | 83 g | of MMA |
| | 1.57 g | of emulsifier |

-continued

| | | |
|---|---|---|
| | 0.1 g | of initiator |
| | 200 g | of distilled water |

Subsequently, Emulsion 2 is added over a period of two hours.

| Emulsion 2 (shell material): | 666 g | of MMA |
|---|---|---|
| | 3.13 g | of emulsifier |
| | 0.2 g | of initiator |
| | 400 g | of distilled water |

After everything has been added, the batch is kept at 80° C. for two hours and then cooled to 25° C. and spray dried. The plastisol properties were tested as in Examples 1–27.

| Storage stability at 30° C. | >21 days |
|---|---|
| Gelled product: | Compatible |

In the following Examples, plastisols suitable for practical use are described (parts are in each case parts by weight).

Example 30

An air-free sprayable plastisol was prepared from the following components:
20 parts of polymer powder according to Example 25
35 parts of dioctyl phthalate
50 parts of chalk.

The homogenized mixture was sprayed onto electrophoretically-primed sheet iron in a thickness of 3 mm. The following gelation conditions were tested:
10 minutes at 80° C.
15 minutes at 160° C.
20 minutes at 140° C.
25 minutes at 120° C.
30 minutes at 100° C.

In all cases, well-adhering flexible coatings are formed.

EXAMPLE 31

In each case, air-free sprayable plastisols are synthesized as follows:
20 parts of polymer powder (according to Examples 2, 13, 17, 23 or 24).
35 parts of dioctyl phthalate
5 parts of trimethylolpropane trimethacrylate
0.2 parts of dicumyl peroxide
60 parts of chalk.

Degreased iron sheets are coated about 3 mm thick with the plastisols obtained and are gelled for 10 minutes at 180° C. In all cases, flexible, well-adhered coatings are formed.

Example 32

Plastisols for immersion are synthesized in each case as follows:
20 parts of polymer powder (according to Examples 2, 13, 17, 23, 24, 25)
35 parts of dicotyl phthalate
5 parts of trimethylolpropane trimethacrylate
0.20 parts of cumol hydroperoxide
30 parts of chalk
10 parts of titanium dioxide.

Degreased iron sheets were coated by dipping and were baked for ten minutes at 180° C. In all cases, well-adhering flexible coatings were formed.

Example 33

A kneadable patching compound was prepared from:
20 parts of a polymer powder (according to Example 25)
30 parts of dioctyl phthalate
60 parts of chalk
1 part of micronized porous silic acid.

The mass was applied by hand about 5 mm thick onto electrophoretically-primed sheet metal and baked for 25 minutes at 120° C. A well-adhering flexible coating was formed.

What is claimed is:

1. A plastisol composition comprising emulsion polymerized particles of a polymethyl methacrylate copolymer and an organic plasticizer in a weight ratio between 10:3 and 1:10, said copolymer particles having a particle size from 0.5 micron to 5 microns and having a core portion of a first polymer which is compatible with said plasticizer and a shell portion, surrounding said core portion, of a second polymer different from said first polymer and incompatible with said plasticizer, the weight ratio of core portion to shell portion being between 3:1 and 1:3, said first polymer of said core portion being a polymer consisting of
    (A) 15 to 100 percent by weight of a member selected from the group consisting of alkyl acrylates having at least three carbon atoms in the alkyl portion, alkyl methacrylates having at least two carbon atoms in the alkyl portion, and styrene,
    (B) 0 to 85 percent by weight of a member selected from the group consisting of methyl acrylate, ethyl acrylate, and methyl methacrylate, and
    (C) 0 to 20 percent by weight of another free radically-polymerizable monomer copolymerizable with (A) and (B), and said second polymer of said shell portion being a polymer consisting of polymethyl methacrylate or a copolymer of methyl methacrylate and a monomer copolymerizable therewith, said copolymer comprising at least 80 percent by weight of methyl methacrylate and having a glass temperature above 50° C.

2. A plastisol as in claim 4 which additionally comprises a filler.

3. A plastisol as in claim 4 wherein said plasticizer is a phthalic acid ester.

* * * * *

UNITED STATES PATENT AND TRADEMARK OFFICE
CERTIFICATE OF CORRECTION

PATENT NO.  : 4,199,486
DATED       : April 22, 1980
INVENTOR(S) : Hans Boessler et al.

It is certified that error appears in the above—identified patent and that said Letters Patent are hereby corrected as shown below:

Column 10, line 57, replace "4" by --1--.

Column 10, line 59, replace "4" by --1--.

Signed and Sealed this

Twenty-second Day of July 1980

[SEAL]

Attest:

SIDNEY A. DIAMOND

Attesting Officer          Commissioner of Patents and Trademarks